US006305320B1

(12) United States Patent
Fore

(10) Patent No.: US 6,305,320 B1
(45) Date of Patent: Oct. 23, 2001

(54) GAME FEEDER SUPPORT ASSEMBLY

(76) Inventor: John Fore, 34624 Hwy. 16, Denham Springs, LA (US) 70726

(*) Notice: Subject to any disclaimer, the term of this patent is extended or adjusted under 35 U.S.C. 154(b) by 0 days.

(21) Appl. No.: 09/568,294

(22) Filed: May 9, 2000

(51) Int. Cl.[7] .............. A01K 1/10; A01K 5/00; A01K 39/00
(52) U.S. Cl. ............. 119/51.01; 119/51.11; 119/52.3; D30/121
(58) Field of Search ............. 119/51.01, 51.11, 119/51.12, 52.3, 57.9, 52.4; D30/121

(56) References Cited

U.S. PATENT DOCUMENTS

| D. 145,124 | * | 7/1946 | Fenton | D30/121 |
| 2,636,474 | * | 4/1953 | Parker | 119/51.11 |
| 3,738,327 | * | 6/1973 | Stirling | 119/51.11 |
| 6,082,300 | * | 7/2000 | Futch | 119/51.11 |

FOREIGN PATENT DOCUMENTS

2632156 * 6/1988 (FR) ................ 119/51.11

* cited by examiner

Primary Examiner—Charles T. Jordan
Assistant Examiner—Judith A. Nelson
(74) Attorney, Agent, or Firm—Joseph N. Breaux

(57) ABSTRACT

A game feeder support assembly for supporting a game feeder at an elevated position for use that includes a raising and lowering mechanism to allow the user to lower the game feeder to a level where refilling and maintenance can be performed without a ladder and then lift the filled game feeder back up to the elevated operational height. The raising and lowering mechanism includes an vertical support pole having an auger portion upon which an auger pole nut assembly is threaded. A feeder unit support assembly is secured to the auger pole nut assembly and is raised and lowered by rotating the auger pole nut assembly.

1 Claim, 4 Drawing Sheets

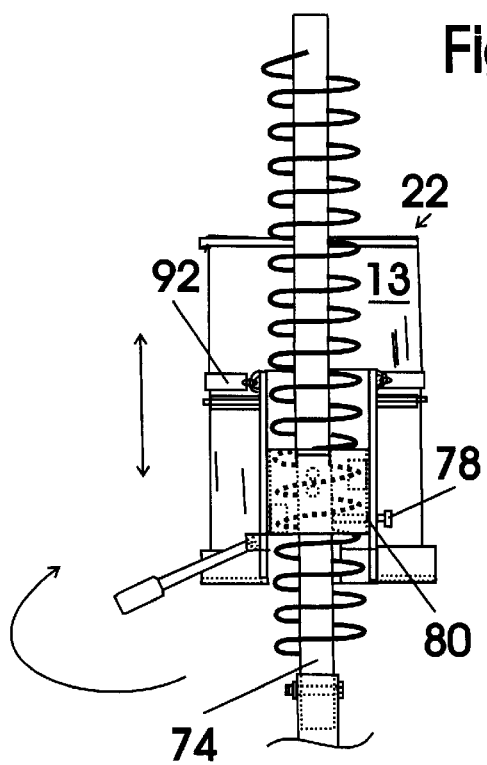
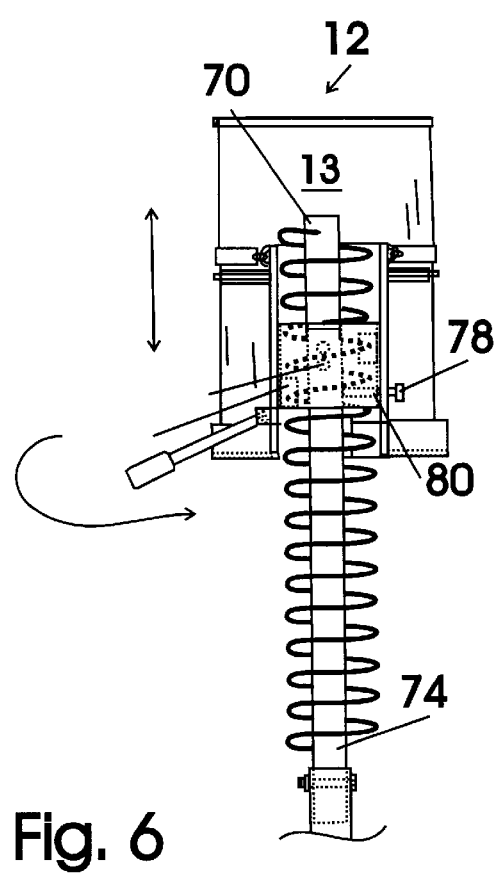

GAME FEEDER SUPPORT ASSEMBLY

TECHNICAL FIELD

The present invention relates to support structures for supporting game feeders for game animals, such as deer, and more particularly to a game feeder support assembly that includes a multi-section vertical support pole assembly including an auger pole portion, an extension portion and a ground insertion portion and a feeder support assembly including a semi-circular game feeder support structure in rigid connection with a box-shaped auger pole nut assembly; the auger pole portion having a bottom auger portion end securable to a top extension portion end; the extension portion having a bottom extension portion end securable to a top ground insertion portion end; the ground insertion portion end having one or more pairs of coaxially aligned apertures through each of which a stabilizer bar is insertable; the auger pole portion having a continuous, rigid, auger flight secured helically around and extending outwardly from an auger pole portion shaft; the auger pole nut assembly including an auger nut box having an exterior surface in rigid connection with the semi-circular game feeder support structure and an auger pole portion passageway formed entirely therethrough between a bottom nut opening and a top nut opening and into which multiple rollers extend from auger nut box interior walls in a pattern such that the multiple rollers engage different sections of the auger flight simultaneously such that as the auger pole nut assembly is rotated in a first rotational direction, while mounted on the auger pole portion, the auger pole nut assembly travels in a first direction toward a top end of the auger pole portion and as the auger pole nut assembly is rotated in a second rotational direction, opposite the first rotational direction, while mounted on the auger pole portion, the auger pole nut assembly travels in a second direction toward a bottom end of the auger pole section; the auger pole nut assembly including a T-handled locking bolt having a threaded end threaded through a threaded aperture formed through the auger nut box and of a length sufficient to allow the T-handled locking bolt to be tightened to contact the auger pole portion shaft to prevent rotation of the auger nut assembly about the auger pole portion; the auger pole nut assembly including a handle connected to the auger nut box for gripping by a user when rotating the auger nut assembly to lower the game feeder for refilling or raising the game feeder to an operating height.

BACKGROUND ART

Many farmers and hunters provide a feeder for periodically distributing feed to animals to supplement the diets of these animals to maintain their health and/or to keep the animals in the area for hunting purposes. Because the feeder is filled with food, most feeders are provided with a support for supporting the feeder unit well above the animals to be fed so that the feeder unit is not destroyed by animals attempting to remove all of the feed at once. Although elevating the feeder unit protects it from damage, elevating the feeder unit also dramatically increases the difficulty of periodically refilling the feeder unit. Because the feeder units are often remotely located in areas frequented by game animals, it can be burdensome to transport a ladder as well as hundreds of pounds of feed to the locations and equally burdensome to carry each of the bags of feed up the ladder to the feed unit to be refilled. It would be a benefit, therefore, to have a game feeder support assembly that could support a game feeder at an elevated position for use but that included a mechanism for lowering the game feeder to a level where refilling and maintenance could be performed without a ladder and then lifting the filled game feeder back up to the elevated operational height.

GENERAL SUMMARY DISCUSSION OF INVENTION

It is thus an object of the invention to provide a game feeder support assembly that includes a multi-section vertical support pole assembly including an auger pole portion, an extension portion and a ground insertion portion and a feeder support assembly including a semi-circular game feeder support structure in rigid connection with a box-shaped auger pole nut assembly; the auger pole portion having a bottom auger portion end securable to a top extension portion end; the extension portion having a bottom extension portion end securable to a top ground insertion portion end; the ground insertion portion end having one or more pairs of coaxially aligned apertures through each of which a stabilizer bar is insertable; the auger pole portion having a continuous, rigid, auger flight secured helically around and extending outwardly from an auger pole portion shaft; the auger pole nut assembly including an auger nut box having an exterior surface in rigid connection with the semi-circular game feeder support structure and an auger pole portion passageway formed entirely therethrough between a bottom nut opening and a top nut opening and into which multiple rollers extend from auger nut box interior walls in a pattern such that the multiple rollers engage different sections of the auger flight simultaneously such that as the auger pole nut assembly is rotated in a first rotational direction, while mounted on the auger pole portion, the auger pole nut assembly travels in a first direction toward a top end of the auger pole portion and as the auger pole nut assembly is rotated in a second rotational direction, opposite the first rotational direction, while mounted on the auger pole portion, the auger pole nut assembly travels in a second direction toward a bottom end of the auger pole section; the auger pole nut assembly including a T-handled locking bolt having a threaded end threaded through a threaded aperture formed through the auger nut box and of a length sufficient to allow the T-handled locking bolt to be tightened to contact the auger pole portion shaft to prevent rotation of the auger nut assembly about the auger pole portion; the auger pole nut assembly including a handle connected to the auger nut box for gripping by a user when rotating the auger nut assembly to lower the game feeder for refilling or raising the game feeder to an operating height.

Accordingly, a game feeder support assembly is provided. The game feeder support assembly includes a multi-section vertical support pole assembly including an auger pole portion, an extension portion and a ground insertion portion and a feeder support assembly including a semi-circular game feeder support structure in rigid connection with a box-shaped auger pole nut assembly; the auger pole portion having a bottom auger portion end securable to a top extension portion end; the extension portion having a bottom extension portion end securable to a top ground insertion portion end; the ground insertion portion end having one or more pairs of coaxially aligned apertures through each of which a stabilizer bar is insertable; the auger pole portion having a continuous, rigid, auger flight secured helically around and extending outwardly from an auger pole portion shaft; the auger pole nut assembly including an auger nut box having an exterior surface in rigid connection with the semi-circular game feeder support structure and an auger pole portion passageway formed entirely therethrough between a bottom nut opening and a top nut opening and into which multiple rollers extend from auger nut box interior walls in a pattern such that the multiple rollers engage different sections of the auger flight simultaneously such that as the auger pole nut assembly is rotated in a first rotational direction, while mounted on the auger pole portion, the auger pole nut assembly travels in a first direction toward a top end of the auger pole portion and as the auger pole nut assembly is rotated in a second rotational direction, opposite the first rotational direction, while mounted on the auger pole portion, the auger pole nut assembly travels in a second direction toward a bottom end of the auger pole section; the auger pole nut assembly including a T-handled locking bolt having a threaded end threaded through a threaded aperture formed through the auger nut box and of a length sufficient to allow the T-handled locking bolt to be tightened to contact the auger pole portion shaft to prevent rotation of the auger nut assembly about the auger pole portion; the auger pole nut assembly including a handle connected to the auger nut box for gripping by a user when rotating the auger nut assembly to lower the game feeder for refilling or raising the game feeder to an operating height.

BRIEF DESCRIPTION OF DRAWINGS

For a further understanding of the nature and objects of the present invention, reference should be made to the following detailed description, taken in conjunction with the accompanying drawings, in which like elements are given the same or analogous reference numbers and wherein:

FIG. 5 is a partial back side plan view of the game feeder support assembly of FIG. 1 with the box-shaped auger pole nut assembly rotated down to the bottom of the auger pole portion to allow for maintenance and refilling.

FIG. 6 is a partial back side plan view of the game feeder support assembly of FIG. 1 with the box-shaped auger pole nut assembly rotated up to the top of the auger pole portion supporting the game feeder at operational height.

EXEMPLARY MODE FOR CARRYING OUT THE INVENTION

Figure 1:
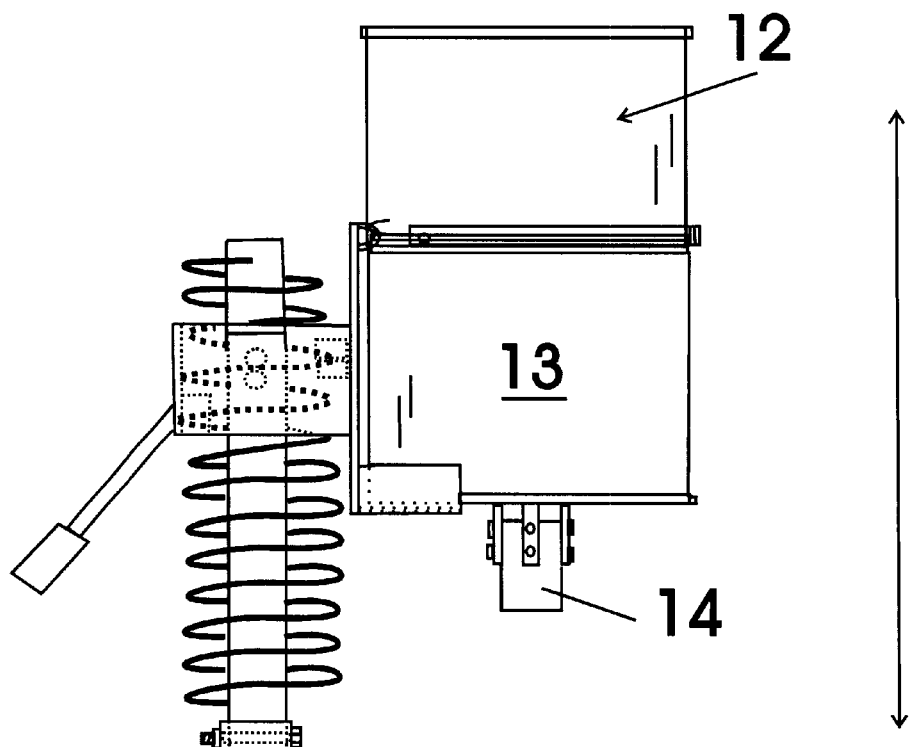
FIG. 1 is a side plan view of an exemplary embodiment of the game feeder support assembly showing the auger pole portion, an extension portion and ground insertion portion of a multi-section vertical support pole assembly and the feeder support assembly including a semi-circular game feeder support structure in rigid connection with a box-shaped auger pole nut assembly; the auger pole portion having a bottom auger portion end securable to a top extension portion end; the extension portion having a bottom extension portion end securable to a top ground insertion portion end; the ground insertion portion end having one or more pairs of coaxially aligned apertures through each of which a stabilizer bar is insertable; the auger pole portion having a continuous, rigid, auger flight secured helically around and extending outwardly from an auger pole portion shaft; the auger pole nut assembly including an auger nut box having an exterior surface in rigid connection with the semi-circular game feeder support structure and an auger pole portion passageway formed entirely therethrough between a bottom nut opening and a top nut opening and into which multiple rollers extend from auger nut box interior walls in a pattern such that the multiple rollers engage different sections of the auger flight simultaneously such that as the auger pole nut assembly is rotated in a first rotational direction, while mounted on the auger pole portion, the auger pole nut assembly travels in a first direction toward a top end of the auger pole portion and as the auger pole nut assembly is rotated in a second rotational direction, opposite the first rotational direction, while mounted on the auger pole portion, the auger pole nut assembly travels in a second direction toward a bottom end of the auger pole section; the auger pole nut assembly including a T-handled locking bolt having a threaded end threaded through a threaded aperture formed through the auger nut box and of a length sufficient to allow the T-handled locking bolt to be tightened to contact the auger pole portion shaft to prevent rotation of the auger nut assembly about the auger pole portion; the auger pole nut assembly including a handle connected to the auger nut box for gripping by a user when rotating the auger nut assembly to lower the game feeder for refilling or raising the game feeder to an operating height.
Figure 1:
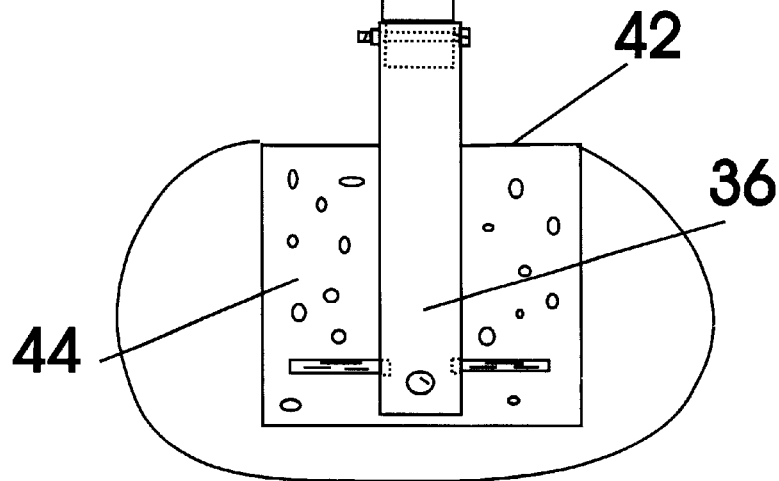
Figure 2:
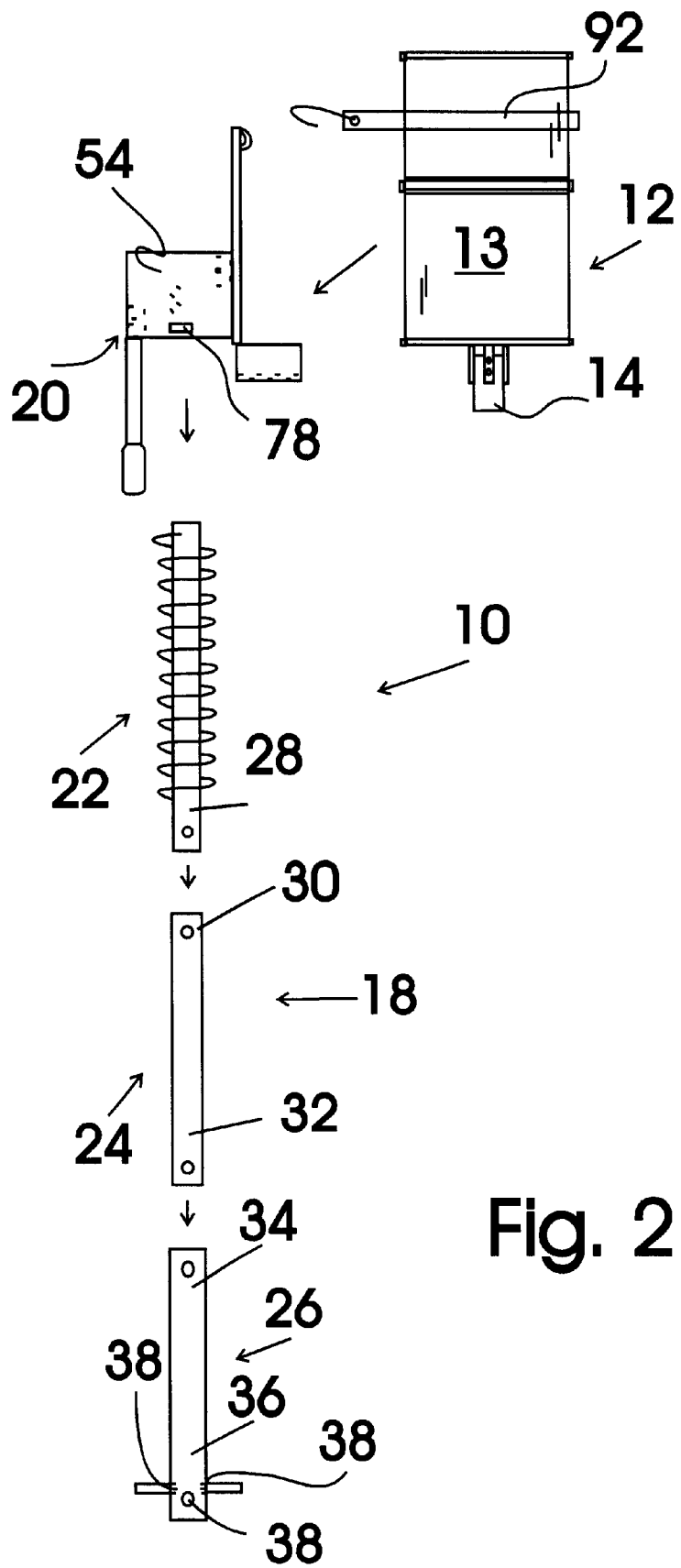
FIG. 2 is an exploded side plan view of game feeder support assembly and representative game feeder of FIG. 1.
Figure 4:
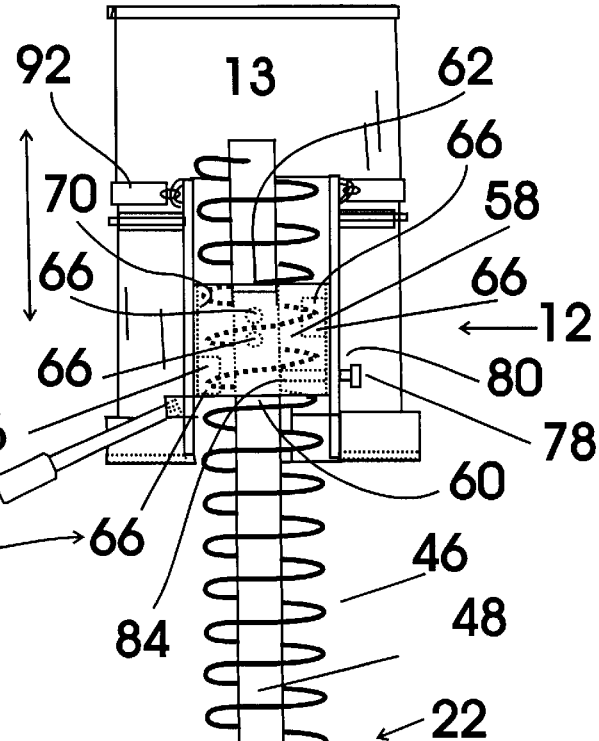
FIG. 4 is a partial back side plan view of the game feeder support assembly of FIG. 1 with the representative game feeder secured to the feeder support assembly with the securing strap surrounding the feeder assembly and secured at either end to one of the two strap securing rings of the game feeder support assembly.
Figure 3:
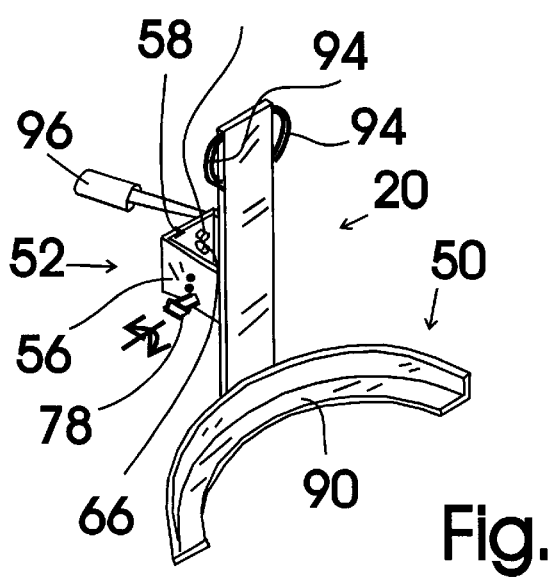
FIG. 3 is a detail perspective view of the feeder support assembly including the feeder support ledge of the semi-circular game feeder support structure and the box-shaped auger pole nut assembly.

FIGS. 1–6 show various aspects of an exemplary embodiment of the game feeder support assembly of the present invention generally designated 10. Game feeder support assembly 10 is used with a representative game feeder, generally designated 12 that includes a container 13 that is filled with feed and includes a dispensing mechanism, generally designated 14, that periodically dispenses the feed.

Game feeder support assembly 10 includes a three-section vertical support pole assembly, generally designated 18, and a feeder support assembly, generally designated 20. Support pole assembly 18 includes an auger pole portion, generally designated 22; an extension portion, generally designated 24; and a ground insertion portion, generally designated 26. Auger pole portion 22 has a bottom auger portion end 28 securable to a top extension portion end 30 using carriage bolts or the like. Extension portion 24 has a bottom extension portion end 32 that is securable to a top ground insertion portion end 34 with carriage bolts or the like. A ground insertion portion bottom end 36 is provided with two pairs of coaxially aligned apertures 38 through each of which a stabilizer bar 40 is insertable. In this example, ground insertion portion bottom end 36 is positioned below the soil surface and encased within concrete 44 (see FIG. 1). Auger pole portion 22 has a continuous, rigid, auger flight 46 secured helically around and extending outwardly from an auger pole portion shaft 48.

Feeder support assembly 20 includes a semi-circular game feeder support structure, generally designated 50 in rigid connection with a box-shaped auger pole nut assembly, generally designated 52. Auger pole nut assembly 52 includes an auger nut box 54 having an exterior surface 56 in rigid connection with semi-circular game feeder support structure 50 and an auger pole portion passageway 58 formed entirely therethrough between a bottom nut opening 60 and a top nut opening 62 and into which multiple rollers 66 extend from auger nut box interior walls 70 that are arranged in a pattern such that the multiple rollers 66 engage different sections of auger flight 46 simultaneously in the manner of the threads of a nut such that as auger pole nut assembly 52 is rotated in a counter-clockwise rotational direction, (see FIG. 6) while mounted on auger pole portion 22, auger pole nut assembly 52 travels in upward toward a top end 70 of auger pole portion 22 and as auger pole nut assembly 52 is rotated in a clockwise rotational direction, (see FIG. 5) while mounted on auger pole portion 22, auger pole nut assembly 52 travels downward toward a bottom end 74 of the auger pole section. Of course, as auger pole nut assembly 52 travels up and down auger pole portion 22, a semi-circular game feeder support structure 50 travels upward and downward also positioning a game feeder 12 seated on a support ledge 90 and held in place with an adjustable length securing strap 92 secured between connecting hooks 94.

Auger pole nut assembly 20 also includes an elongated, T-handled locking bolt 78 that has a threaded end threaded through a threaded aperture 80 formed through auger nut box 56 and that is of a length sufficient to allow T-handled locking bolt 78 to be tightened so that a tip end 84 (FIG. 4) contacts auger pole portion shaft 48 preventing rotation of auger nut assembly 52 about auger pole portion 22. T-handled locking bolt 78 can be oriented downward to a allow a user to easily lock and unlock auger nut assembly 52 when it is at the upper end 70 of auger pole portion 22. A handle 96 is connected to auger nut assembly 52 that pivots down for gripping by a user to assist a user when rotating auger nut assembly 52 to lower game feeder 12 for refilling and raising game feeder 12 to an operating height.

It can be seen from the preceding description that a game feeder support assembly has been provided.

It is noted that the embodiment of the game feeder support assembly described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A game feeder support assembly for supporting a game feeder, said game feeder support assembly comprising:

a vertical support pole having an auger pole portion and a ground insertion portion; and a feeder support assembly including a means for supporting a game feeder in rigid connection with an auger pole nut assembly;

said auger pole portion having an auger flight secured helically around and extending outwardly from an auger pole portion shaft;

said auger pole nut assembly including an auger pole portion passageway formed entirely therethrough between a bottom nut opening and a top nut opening and into which multiple rollers extend in a pattern such that said multiple rollers engage different sections of said auger flight simultaneously such that as said auger pole nut assembly is rotated in a first rotational direction, while mounted on said auger pole portion, said auger pole nut assembly travels in a first direction toward a top end of said auger pole portion and as said auger pole nut assembly is rotated in a second rotational direction, opposite said first rotational direction, while mounted on said auger pole portion, said auger pole nut assembly travels in a second direction toward a bottom end of said auger pole section;

said auger pole nut assembly including a means for locking said auger pole nut assembly in fixed relation to said auger pole portion;

said locking means having a user releasing mechanism for allowing a user to rotate said auger pole nut assembly to raise or lower a game feeder supported on said feeder support structure means.

\* \* \* \* \*